US011550479B1

(12) United States Patent
Shatsky et al.

(10) Patent No.: US 11,550,479 B1
(45) Date of Patent: Jan. 10, 2023

(54) METADATA MANAGEMENT IN STORAGE SYSTEMS

(71) Applicant: Dell Products L.P., Round Rock, TX (US)

(72) Inventors: Yosef Shatsky, Karnei Shomron (IL); Doron Tal, Geva Carmel (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/511,699

(22) Filed: Oct. 27, 2021

(51) Int. Cl.
*G06F 12/00* (2006.01)
*G06F 3/06* (2006.01)
*G06F 16/13* (2019.01)
*G06F 16/16* (2019.01)

(52) U.S. Cl.
CPC .......... *G06F 3/0613* (2013.01); *G06F 3/0656* (2013.01); *G06F 3/0683* (2013.01); *G06F 16/13* (2019.01); *G06F 16/164* (2019.01)

(58) Field of Classification Search
CPC .... G06F 3/0613; G06F 3/0656; G06F 3/0683; G06F 3/0641; G06F 3/0689; G06F 16/164; G06F 16/13; G06F 16/2246; G06F 16/2228; G06F 16/215; G06F 12/0802
See application file for complete search history.

(56) References Cited

U.S. PATENT DOCUMENTS

| 5,381,539 A | 1/1995 | Yanai et al. |
| 5,551,003 A | 8/1996 | Mattson et al. |
| 5,764,880 A | 6/1998 | Gerdt et al. |
| 6,052,799 A | 4/2000 | Li et al. |
| 6,941,420 B2 | 9/2005 | Butterworth et al. |
| 8,843,676 B2 | 9/2014 | Rajamanickam et al. |
| 9,372,751 B2 | 6/2016 | McNutt |

(Continued)

FOREIGN PATENT DOCUMENTS

| WO | 2015108670 A1 | 7/2015 |
| WO | PCT/US2019/024885 | 1/2020 |

(Continued)

OTHER PUBLICATIONS

Dell EMC, "Dell EMC VxRack FLEX," Dell EMC Product Overview, 2018, 5 pages.

(Continued)

*Primary Examiner* — Shawn X Gu
(74) *Attorney, Agent, or Firm* — Ryan, Mason & Lewis, LLP

(57) ABSTRACT

Techniques are disclosed for managing metadata of a storage system. A storage control system receives data to be written to primary storage, and writes the received data together with metadata to a write cache. The storage control system destages the metadata from the write cache to a primary metadata structure which is configured to persistently store and index the metadata. The primary metadata structure comprises (i) a first data structure that is configured to accumulate the metadata destaged from the write cache and organize the accumulated metadata in blocks of metadata sorted by index keys, and (ii) a second data structure that is configured to receive the accumulated metadata from the first data structure, and organize the received metadata using an index structure that enables random-access to the metadata using the index keys.

20 Claims, 8 Drawing Sheets

(56) References Cited

U.S. PATENT DOCUMENTS

| | | | |
|---|---|---|---|
| 9,514,014 | B2 | 12/2016 | Webman et al. |
| 9,892,045 | B1 | 2/2018 | Douglis et al. |
| 10,078,598 | B1 | 9/2018 | Wallace et al. |
| 10,331,561 | B1 | 6/2019 | Shilane et al. |
| 10,445,180 | B2 | 10/2019 | Butterworth et al. |
| 10,986,174 | B1 | 4/2021 | Sharma et al. |
| 11,119,668 | B1 | 9/2021 | Keller et al. |
| 11,144,399 | B1 | 10/2021 | Yarimi et al. |
| 11,163,479 | B2 | 11/2021 | Lieblich et al. |
| 11,163,699 | B2 | 11/2021 | Keller et al. |
| 2002/0032835 | A1 | 3/2002 | Li et al. |
| 2008/0021853 | A1 | 1/2008 | Modha et al. |
| 2009/0204761 | A1 | 8/2009 | Caprioli et al. |
| 2009/0276593 | A1 | 11/2009 | Jacobson et al. |
| 2013/0305002 | A1 | 11/2013 | Hallak et al. |
| 2014/0215147 | A1 | 7/2014 | Pan |
| 2014/0215262 | A1 | 7/2014 | Li et al. |
| 2014/0244935 | A1 | 8/2014 | Ezra et al. |
| 2016/0103764 | A1 | 4/2016 | Banerjee et al. |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0163587 | A1 | 5/2019 | Anna et al. |
| 2019/0227845 | A1 | 7/2019 | Sridhar et al. |
| 2020/0133503 | A1 | 4/2020 | Sun et al. |
| 2020/0201821 | A1* | 6/2020 | Wang .................. G06F 16/13 |
| 2021/0279187 | A1 | 9/2021 | Puder et al. |
| 2021/0294505 | A1 | 9/2021 | Keller et al. |
| 2021/0294774 | A1 | 9/2021 | Keller et al. |
| 2021/0294775 | A1 | 9/2021 | Keller et al. |
| 2021/0303160 | A1 | 9/2021 | Lieblich et al. |
| 2021/0303169 | A1 | 9/2021 | Tagar et al. |
| 2021/0303202 | A1 | 9/2021 | Ben Zeev et al. |
| 2021/0303401 | A1 | 9/2021 | Yarimi et al. |
| 2021/0303407 | A1 | 9/2021 | Keller et al. |
| 2021/0303480 | A1 | 9/2021 | Keller et al. |

FOREIGN PATENT DOCUMENTS

| | | |
|---|---|---|
| WO | PCT/US2019/024900 | 1/2020 |
| WO | 2020204880 A1 | 10/2020 |
| WO | 2020204882 A1 | 10/2020 |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 13 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

Dell EMC, "Dell EMC VxFlex Family Overview," Technical White Paper, May 2019, 44 pages.

J. Nakano et al., "ReViveI/O: Efficient Handling of I/O in Highly-Available Rollback-Recovery Servers," HPCA, 10.1109/2006. 1598129, pp. 200-211.

Wikipedia, "Raft (Computer Science)," https://en.wikipedia.org/wiki/Raft_(computer_science), Feb. 10, 2020, 4 pages.

Wikipedia, "Paxos (Computer Science)," https://en.wikipedia.org/wiki/Paxos_(computer_science), Dec. 6, 2019, 21 pages.

Wikipedia, "State Machine Replication," https://en.wikipedia.org/wiki/State_machine_replication, Dec. 14, 2019, 9 pages.

Dell Technologies, "Dell EMC PowerFlex: Secure Snapshots," Technical White Paper, Jul. 2020, 17 pages.

Dell Technologies, "Dell EMC PowerFlex: Protected Maintenance Mode," Technical White Paper, Jul. 2020, 20 pages.

Dell Technologies, "Dell EMC PowerFlex: Introduction to Replication," Technical White Paper, Jun. 2020, 34 pages.

Dell Technologies, "Dell EMC PowerFlex: Networking Best Practices and Design Considerations," Best Practices, Jun. 2020, 64 pages.

Dell EMC, "Getting to Know Dell EMC PowerFlex," Version 3.5.x, Rev. 02, Jan. 2021, 66 pages.

U.S. Appl. No. 16/888,742 filed in the name of Rivka Matosevich et al. filed May 31, 2020, and entitled "Balancing Resiliency and Performance by Selective Use of Degraded Writes and Spare Capacity in Storage Systems."

U.S. Appl. No. 16/918,654 filed in the name of Rivka Matosevich et al. filed Jul. 1, 2020, and entitled "Sharing Memory Resources Between Asynchronous Replication Workloads."

U.S. Appl. No. 16/983,423 filed in the name of Dan Aharoni et al. filed Aug. 3, 2020, and entitled "Deferred Reclamation of Invalidated Entries that are Associated with a Transaction Log in a Log-Structured Array."

U.S. Appl. No. 17/065,754 filed in the name of Dan Aharoni et al. filed Oct. 8, 2020, and entitled "Direct Response to IO Request in Storage System with Remote Replication."

U.S. Appl. No. 17/070,073 filed in the name of Dan Aharoni et al. filed Oct. 14, 2020, and entitled "Direct Response to IO Request in Storage System Having an Intermediary Target Apparatus."

U.S. Appl. No. 17/070,288 filed in the name of Anurag Sharma et al. filed Oct. 14, 2020, and entitled "Pipeline-Based System for Configuration Checking and Reporting Associated with an Information Processing System."

U.S. Appl. No. 17/071,407 filed in the name of John Moran et al. filed Oct. 15, 2020, and entitled "Dynamic Remediation Actions in Response to Configuration Checks in an Information Processing System."

U.S. Appl. No. 17/077,105 filed in the name of Yosef Shatsky et al. filed Oct. 22, 2020, and entitled "Volume Tiering in Storage Systems."

U.S. Appl. No. 17/106,988 filed in the name of Rivka Matosevich et al. filed Nov. 30, 2020, and entitled "Managing Host Connectivity to a Data Storage System."

U.S. Appl. No. 17/123,525 filed in the name of Itay Keller et al. filed Dec. 16, 2020, and entitled "Deferred Reclamation of Invalidated Entries Associated with Replication in a Log-Structured Array."

U.S. Appl. No. 17/145,646 filed in the name of Yosef Shatsky et al. filed Jan. 11, 2021, and entitled "Redistribution of Processing Groups between Server Nodes Based on Hardware Resource Utilization."

U.S. Appl. No. 17/232,203 filed in the name of Roman Spiegelman filed Apr. 16, 2021, and entitled "Object Synchronization of Server Nodes in a Network Computing Environment."

U.S. Appl. No. 17/236,256 filed in the name of Doron Tal et al. filed Apr. 21, 2021, and entitled "Recovery from Partial Device Error in Data Storage System."

U.S. Appl. No. 17/306,601 filed in the name of Rivka Matosevich et al. filed May 3, 2021, and entitled "Managing Replication Journal in a Distributed Replication System."

U.S. Appl. No. 17/308,166 filed in the name of Adi Bar Shalom et al. filed May 5, 2021, and entitled "Journal Barrier Consistency Determination."

U.S. Appl. No. 17/351,733 filed in the name of Yosef Shatsky et al. filed Jun. 18, 2021, and entitled "Data Deduplication in a Disaggregated Storage System."

U.S. Appl. No. 17/361,666 filed in the name of Yosef Shatsky et al. filed Jun. 29, 2021, and entitled "Tracking Utilization of Data Blocks in a Storage System."

* cited by examiner

100

METADATA MANAGEMENT IN STORAGE SYSTEMS

TECHNICAL FIELD

This disclosure relates generally to data storage management techniques and, more particularly, to techniques for managing metadata in a data storage system.

BACKGROUND

Storage systems utilize some form of internal layout for a physical data layer, and employ a mapping mechanism from a logical layer (as understood by user volumes or files) to a physical layer that is used to store data. A storage controller may arrange data in the physical layer using various methods such as, e.g., packing data to conserve capacity, implementing a log-structured array, storage tiering, etc. In addition, storage systems require various types of metadata to support core storage functionality. Such metadata includes, e.g., metadata for mapping logical locations (offset in a file or volume) to a physical location (to track the physical location of stored data items), invalidation and garbage collection related metadata, metadata accounting, deduplication referencing, snapshot generations and relationships, and resiliency related metadata (e.g., RAID), etc. The metadata must be resilient to failures such as a device or a node going offline, because without the metadata, the stored data become inaccessible and key functionality breaks. In addition, the process of persisting metadata should not add a significant amount of bandwidth or IOPS (input/output operations per second) which degrades system performance and affects the endurance of storage devices used to store the metadata. In this regard, efficient metadata management is critical to overall performance of a data storage system.

SUMMARY

Exemplary embodiments of the disclosure include techniques for managing metadata. For example, an exemplary embodiment includes a method that is performed by a storage control system for managing metadata of a storage system. The storage control system receives data to be written to primary storage, and writes the received data together with metadata to a write cache. The storage control system destages the metadata from the write cache to a primary metadata structure which is configured to persistently store and index the metadata. The primary metadata structure comprises (i) a first data structure that is configured to accumulate the metadata destaged from the write cache and organize the accumulated metadata in blocks of metadata sorted by index keys, and (ii) a second data structure that is configured to receive the accumulated metadata from the first data structure, and organize the received metadata using an index structure that enables random-access to the metadata using the index keys.

Other embodiments of the disclosure include, without limitation, systems and articles of manufacture comprising processor-readable storage media, which are configured for managing metadata of a storage system.

DETAILED DESCRIPTION

Figure 1:
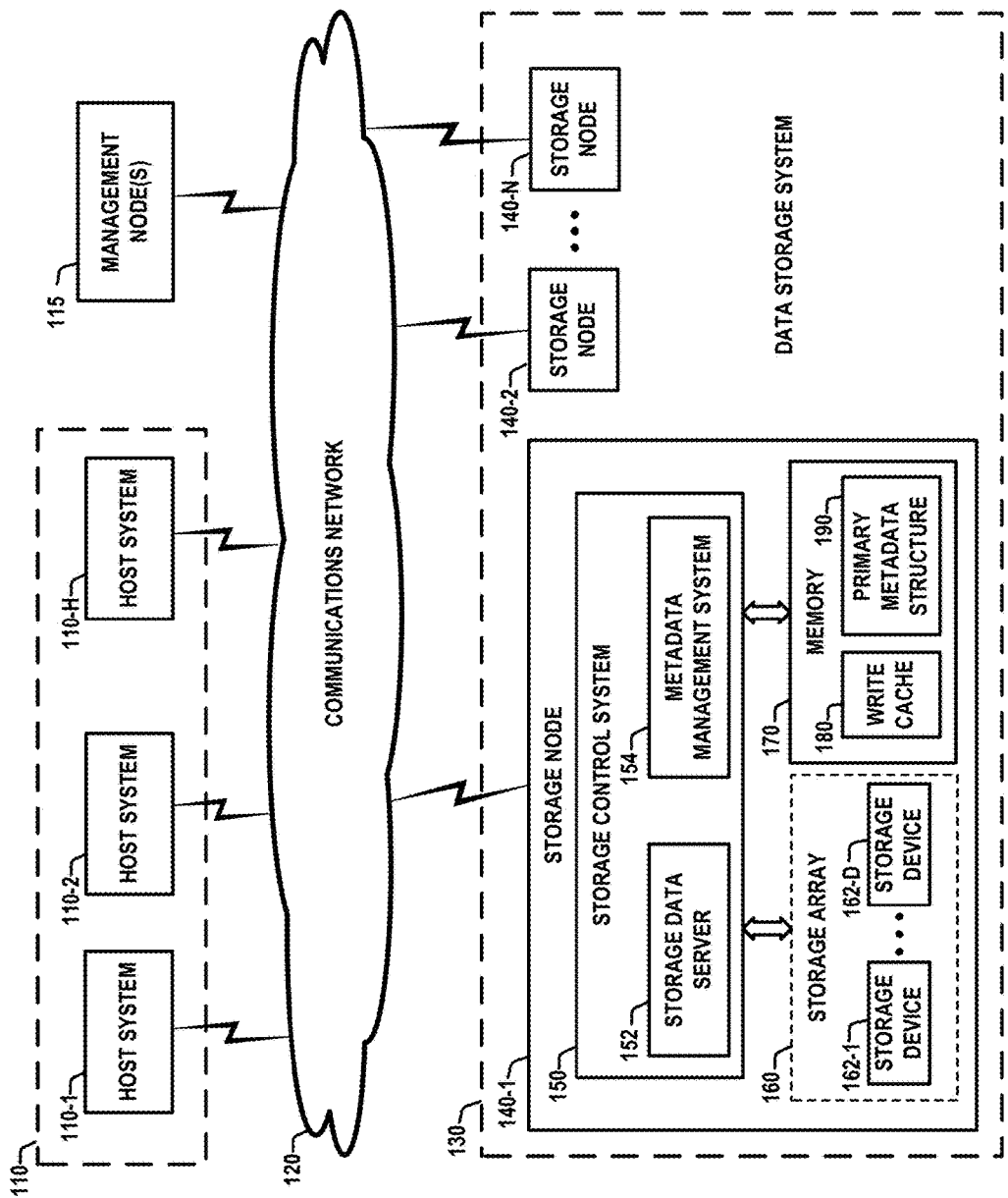
FIG. 1 schematically illustrates a network computing system comprising a data storage system which implements a metadata management system, according to an exemplary embodiment of the disclosure.

Exemplary embodiments of the disclosure will now be discussed in further detail with regard to systems and methods for managing metadata in a storage system. For purposes of illustration, exemplary embodiments will be described herein with reference to exemplary network computing environments, such as distributed storage environments, which implement data processing systems and associated computers, servers, storage devices and other processing devices. It is to be appreciated, however, that these and other embodiments are not restricted to the particular illustrative system and device configurations shown. Accordingly, the term "network computing environment" as used herein is intended to be broadly construed, so as to encompass, for example, processing systems comprising cloud computing and storage systems, as well as other types of processing systems comprising various combinations of physical and virtual processing resources. A network computing environment may therefore comprise, for example, at least one data center or other cloud-based systems that include one or more cloud systems that host multiple tenants which share cloud resources. Numerous different types of enterprise computing and storage systems are also encompassed by the term "network computing environment" as that term is broadly used herein FIG. 1 schematically illustrates a network computing system comprising a data storage system which implements a metadata management system, according to an exemplary embodiment of the disclosure. The network computing system 100 comprises one or more host systems 110-1, 110-2, . . . 110-H (collectively, host systems 110), one or more management nodes 115, a communications network 120, and a data storage system 130. The data storage system 130 comprises one or more storage nodes 140-1, 140-2, . . . , 140-N (collectively, storage nodes 140). As shown in FIG. 1, the storage node 140-1 comprises a storage control system 150, a storage array 160 (e.g., primary storage) comprising a plurality of storage devices 162-1, . . . , 162-D (collectively, storage devices 162), and primary memory 170 (alternatively, system memory 170). The primary memory 170 comprises volatile random-access memory (RAM) and non-volatile RAM (NVRAM). The storage control system 150 comprises a storage data server 152, and a metadata management system 154. The primary memory 170 is configured to implement a write cache 180 and a primary metadata structure 190. The metadata management system 154 implements methods that are configured to provision and manage the primary metadata structure 190. As explained in further detail below, the metadata management system 154 is configured to utilize the write cache 180 and the primary metadata structure 190 to manage metadata on the storage node 140. In some embodiments, the other storage nodes 140-2 . . . 140-N have the same or similar configuration as the storage node 140-1 shown in FIG. 1.

In general, the management nodes 115 implement application programming interfaces (APIs) to enable manual, automated, and/or semi-automated configuration, management, provisioning, and monitoring of the data storage system 130 and the associated storage nodes 140. In some embodiments, the management nodes 115 comprise stand-alone dedicated management server nodes, which may comprise physical and/or virtual server nodes.

The host systems 110 comprise physical server nodes and/or virtual server nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the host systems 110 comprise application servers, database servers, etc. The host systems 110 can include virtual nodes such as virtual machines and container systems. In some embodiments, the host systems 110 comprise a cluster of computing nodes of an enterprise computing system, a cloud-based computing system, or other types of computing systems or information processing systems comprising multiple computing nodes associated with respective users. The host systems 110 issue data access requests to the data storage system 130, wherein the data access requests include (i) write requests to store data in the storage arrays 160 of the storage nodes 140 and (ii) read requests to access data that is stored in the storage arrays 160 of the storage nodes 140.

The communications network 120 is configured to enable communication between the host systems 110 and the storage nodes 140, and between the management nodes 115, the host systems 110, and the storage nodes 140, as well as to enable peer-to-peer communication between the storage nodes 140 of the data storage system 130. In this regard, while the communications network 120 is generically depicted in FIG. 1, it is to be understood that the communications network 120 may comprise any known communications network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., IP-based or Fiber Channel storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniB and, Gigabit Ethernet, etc., to implement I/O channels and support storage network connectivity. Numerous alternative networking arrangements are possible in a given embodiment, as will be appreciated by those skilled in the art.

The data storage system 130 may comprise any type of data storage system, or combination of data storage systems, including, but not limited to, a storage area network (SAN) system, a network-attached storage (NAS) system, a direct-attached storage (DAS) system, dynamic scale-out data storage systems, or other types of distributed data storage systems comprising software-defined storage, clustered or distributed virtual and/or physical infrastructure. The term "data storage system" as used herein should be broadly construed and not viewed as being limited to storage systems of any particular type or types. It is to be noted that each storage node 140 and its associated storage array 160 is an example of what is more generally referred to herein as a "storage system" or a "storage array." The storage nodes 140 can be physical nodes, virtual nodes, and a combination of physical and virtual nodes.

In some embodiments, the storage nodes 140 comprise storage server nodes (e.g., server node 800, shown in FIG. 8) having processor and system memory, and possibly implementing virtual machines and/or containers, although numerous other configurations are possible. In some embodiments, one or more of the storage nodes 140 can additionally implement functionality of a compute node, and vice-versa, wherein a compute node is configured to process data and execute tasks/workloads and perform computational work, either individually, or in a distributed manner, to thereby provide compute services such as execution of one or more applications on behalf of one or more users. In this regard, the term "storage node" as used herein is therefore intended to be broadly construed, and a storage system in some embodiments can be implemented using a combination of storage nodes and compute nodes.

In some embodiments, each storage node 140 comprises a server node that is implemented on, e.g., a physical server machine or storage appliance comprising hardware processors, system memory, and other hardware resources that execute software and firmware to implement the functionalities and data management services of the storage node 140 and the storage control system 150, as discussed herein. More specifically, in some embodiments, each storage node 140 comprises a plurality of storage control processors which execute a lightweight operating system (e.g., a customized lightweight Linux kernel) and functional software (e.g., software-defined storage software) to implement various functions of the storage node 140 and the storage control system 150, wherein such functions include, but are not limited to, (i) managing and executing data access requests issued by the host systems 110, (ii) performing various data management and storage services, and (iii) controlling network communication and connectivity with the host systems 110 and between the storage nodes 140 within the data storage system 130, etc.

In a distributed storage environment, the storage control systems 150 of the storage nodes 140 are configured to communicate in a cooperative manner to perform functions such as e.g., processing data access requests received from the host systems 110, aggregating/pooling the storage capacity of the storage arrays 160 of the storage nodes 140, performing functions such as inline data compression/decompression, data deduplication, thin provisioning, and data protection functions such as data replication, snapshot, and data protection and resiliency schemes based on data striping and/or parity (e.g., erasure coding, RAID, etc.), and other types of data management functions, depending on the system configuration.

The storage devices 162 comprise one or more of various types of storage devices such as hard-disk drives (HDDs), solid-state drives (SSDs), Flash memory cards, or other types of non-volatile memory (NVM) devices including, but not limited to, non-volatile random-access memory (NVRAM), phase-change RAM (PC-RAM), magnetic RAM (MRAM), etc. In some embodiments, the storage devices 162 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices may be implemented in the data storage system 130. In this regard, the term "storage device" as used herein should be broadly construed to encompass all types of persistent storage media including hybrid drives.

In some embodiments, the storage array 160 of a given storage node 140 comprises DAS resources (internal and/or external), wherein the storage control system 150 of the given storage node 140 is configured to directly access the storage array 160 of the given storage node 140. In some embodiments, the data storage system 130 comprises a disaggregated data storage system in which storage data processing is separate from data storage. More specifically, in an exemplary embodiment of a disaggregated storage system, the storage control systems 150 comprise storage control nodes, and the storage arrays 160 comprises storage nodes, which are separate from the storage control nodes. In such a configuration, the storage control nodes (e.g., storage control systems 150) are configured to handle the processing of data associated with data access requests (i.e., input/output (I/O) read and write requests), and the storage nodes (storage array 160) are configured to handle writing/reading data to/from respective storage devices 162. In a disaggregated architecture, each storage control node (e.g., each storage control system 150) would be configured to directly access data stored in each storage node (e.g., each storage array 160) in the data storage system 130. The disaggregated storage system architecture essentially separates the storage control compute layers (e.g., storage control systems 150) from the data storage layers (e.g., storage arrays 160).

In a disaggregated data storage system, each storage array 160 is implemented as, e.g., an external DAS device, wherein each storage control system 150 of each storage node 140-1, 140-2, . . . , 140-N is connected to each storage array 160 using any suitable interface protocol such as Small Computer Systems Interface (SCSI), Fibre Channel (FC), etc. In other embodiments, the storage control systems 150 of the storage nodes 140-1, 140-2, . . . , 140-N can be network-connected to each of the storage arrays 160 (via a high-performance network fabric) using any suitable network configuration and network interface protocol such as Ethernet, FC, Internet Small Computer Systems Interface (iSCSI), InfiniBand, etc. For example, in some embodiments, the storage nodes 140 and the storage arrays 160 are interconnected in a full-mesh network, wherein back-end interconnectivity between the storage nodes 140 and the storage arrays 160 is achieved using, e.g., a redundant high-speed storage fabric, wherein the storage control systems 150 can utilize remote procedure calls (RPC) for control messages and remote direct memory access (RDMA) for moving data blocks.

In some embodiments, the storage data servers 152 of the storage nodes 140 are configured to consolidate the capacity of the storage arrays 160 (e.g., HDDs, SSDs, PCIe or NVMe flash cards, etc.) of the storage nodes 140 into storage pools from which logical volumes are allocated, wherein the logical volumes (e.g., a block unit of storage management) are identified by, e.g., logical unit numbers (LUNs). More specifically, the storage data servers 152 of the storage nodes 140 are configured to create and manage storage pools (e.g., virtual pools of block storage) by aggregating storage capacity of the storage arrays 160 of the storage nodes 140 and dividing a given storage pool into one or more volumes, wherein the volumes are exposed to the host systems 110 as block devices. For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In some embodiments, each host system 110 comprises a storage data client (SDC) which executes on the host system and which consumes the block storage exposed by the storage data servers 152. In particular, an SDC comprises a lightweight block device driver that is deployed on a given host system 110 to expose shared block volumes to the given host system 110. The SDC exposes the storage volumes as block devices to each application (e.g., virtual machine, container, etc.) that execute on the same server (e.g., host system 110) on which the SDC is installed. The SDC of a given host system 110 exposes block devices representing the virtual storage volumes that are currently mapped to the given host system 110. The SDC for a given host system 110 serves as a block driver for the host system 110, wherein the SDC intercepts I/O requests, and utilizes the intercepted I/O request to access the block storage that is managed by the storage data servers 152. The SDC provides the operating system or hypervisor (which runs the SDC) access to the logical block devices (e.g., volumes). Each SDC has knowledge of which storage data servers 152 hold (e.g., own) their block data, so multipathing can be accomplished natively through the SDCs.

As noted above, the management nodes 115 in FIG. 1 implement a management layer which manages and configures the network computing system 100. In some embodiments, the management nodes 115 comprise a tightly-coupled cluster of manager nodes that are configured to supervise the operations of the storage cluster and manage storage cluster configurations. For example, management nodes 115 include metadata manager (MDM) modules that operate outside of the data path and provide the relevant information to the SDCs and the storage data servers 152 to allow such components to control data path operations. The MDM modules are configured to manage the mapping of SDCs to the storage data servers 152 of the storage nodes 140. The MDM modules manage various types of metadata that are required to perform various management operations in the storage environment such as, e.g., managing configuration changes, managing the SDCs and storage data servers 152, maintaining and updating device mappings, maintaining management metadata for controlling data protection operations such as snapshots, replication, RAID configurations, etc., managing system capacity including device allocations and/or release of capacity, performing operation for recovery from errors and failures, and system rebuild tasks including rebalancing, etc.

The metadata management system 154 is configured to utilize the write cache 180 and the primary metadata structure 190 to manage metadata of the storage system. The write cache 180 and the primary metadata structure 190 are maintained in a persistence storage/memory resource. In the context of a software-defined storage system, the storage control system 150 is essentially a hardware independent storage control system which is configured to abstract storage and memory resources from the underlying hardware platform for greater flexibility, efficiency and faster scalability. In this regard, the storage control system 150 will have no control over the types of storage and memory hardware resources that will be utilized during run-time. In this regard, in some embodiments, the write cache 180 and the primary metadata structure 190 are implemented in primary memory 170. In other embodiments, the write cache 180 and/or the primary metadata structure 190 can be implemented in primary storage (e.g., the storage array 160).

As noted above, the primary memory 170 comprises volatile RAM such as dynamic RAM (DRAM), synchronous DRAM (SDRAM), etc. In some embodiments, the primary memory 170 comprises non-volatile memory which is configured as RAM. For example, in some embodiments, the primary memory 170 comprises a storage class memory (SCM) tier which extends the RAM that is available to the operating system of the storage node 140. The SCM tier can be implemented with various types of non-volatile memory media hardware such as persistent memory (PMEM) modules, solid-state drive (SSD) devices, nonvolatile dual in-line memory modules (NVDIMMs), and other types of persistent memory modules with a DRAM form factor, etc. In addition, the persistent memory may be implemented using a vaulting RAM system which comprises a battery-backed RAM in which data is stored to vault devices upon device or power failure. In general, the non-volatile memory devices can be accessed over a memory bus (implemented via, e.g., Peripheral Component Interconnect Express) using a suitable interface such as non-volatile memory express (NVMe).

The metadata management system 154 is configured to implement a high-performance metadata storage and processing system through use of the primary metadata structure 190. For example, the metadata is maintained and managed in such a manner that the metadata is at least as resilient as the associated data. In addition, the metadata is maintained and managed in a manner that the metadata is swappable between RAM and persistent storage. Due to the size of the metadata, the metadata may not fit within RAM in many cases. As such, the metadata management system allows relevant metadata is be maintained in RAM, and then allows swapping in of metadata when the workload changes. Further, the metadata is generated and managed in a way that minimizes write overhead. For example, the persisting of the metadata does not add a significant amount of bandwidth or IOPS. In addition, the metadata management system supports both random and sequential access to the metadata. Exemplary systems and methods for tracking the data block utilization according to embodiments of the disclosure will now be discussed in further detail in conjunction with FIGS. 2-7.

Figure 2:
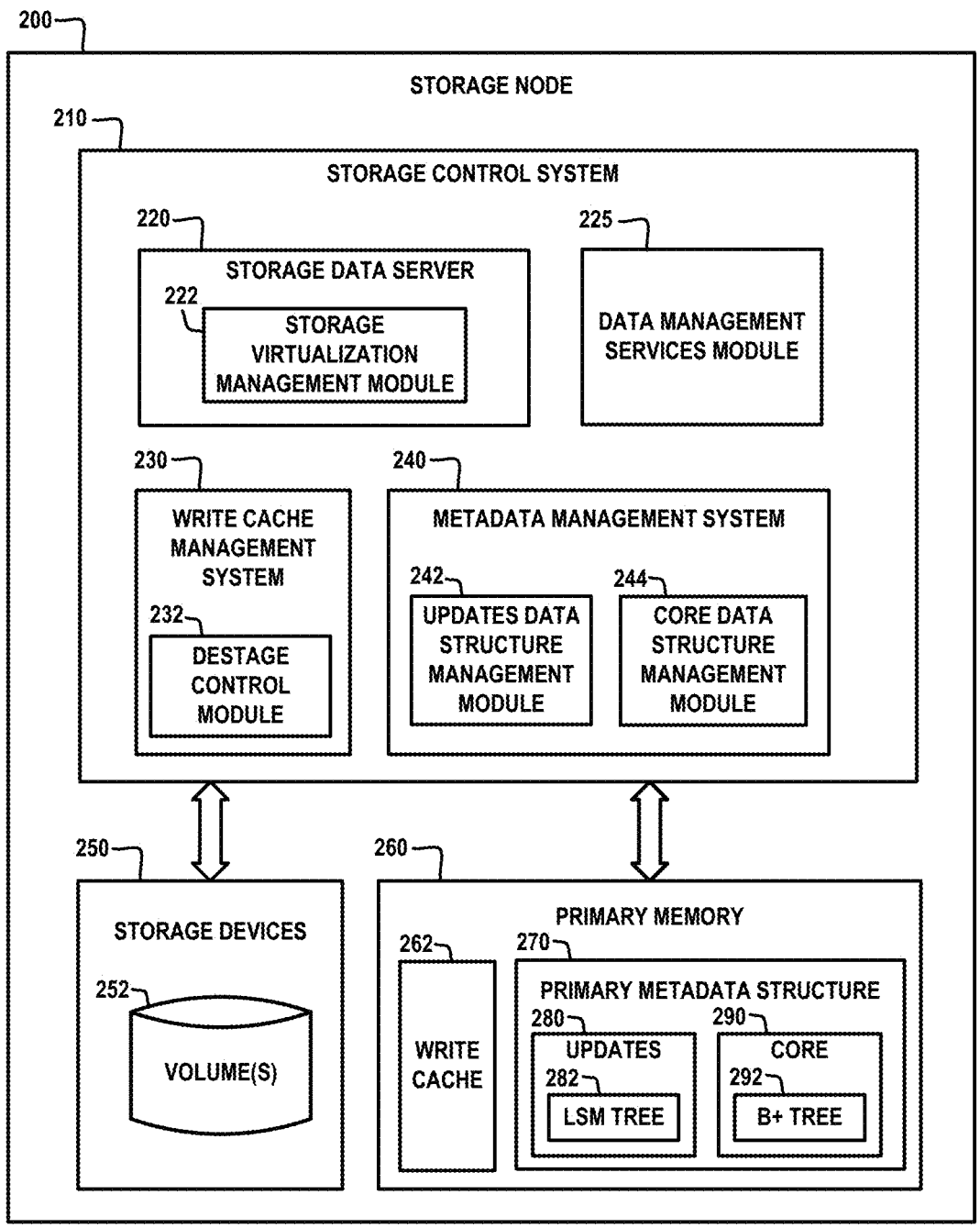
FIG. 2 schematically illustrates a storage node which comprises a metadata management system, according to an exemplary embodiment of the disclosure.

FIG. 2 schematically illustrates a storage node 200 which comprises a metadata management system, according to an exemplary embodiment of the disclosure. In some embodiments, FIG. 2 schematically illustrates an exemplary architecture of the storage nodes 140 of the data storage system 130 of FIG. 1. As shown in FIG. 2, the storage node 200 comprises a storage control system 210 which implements a storage data server 220, a data management services module 225, a write cache management system 230, and a metadata management system 240. The storage data server 220 comprises a storage virtualization management module 222. The write cache management system 230 comprises various functional modules including, but not limited to, a write cache destage control module 232. The metadata management system 240 comprises various functional modules including, but not limited to, a first metadata structure management module 242 (alternatively referred to herein as an "updates data structure" management module 242), and a second metadata structure management module 244 (alternatively referred to herein as a "core data structure" management module 244).

The storage node 200 further comprises an array of storage devices 250 and primary memory 260. The storage devices 250 comprise primary storage resources, wherein at least some capacity of the storage devices 250 is partitioned into one or more storage volumes 252. In the exemplary embodiment of FIG. 2, the primary memory 260 comprises a write cache 262 which is provisioned and managed by the write cache management system 230. In some embodiments, the write cache 262 resides in a region of non-volatile RAM (e.g., PMEM memory, SSD memory, etc.), which is allocated for the write cache 262. In other embodiments, the write cache 262 resides in an allocated region of the storage space of the array of storage devices 250.

As further shown in FIG. 2, the primary memory 260 comprises a primary metadata structure 270. The primary metadata structure 270 comprises a first data structure 280 (referred to as the updates data structure 280), and a second data structure 290 (referred to as the core data structure 290). The updates data structure 280 is provisioned and managed by the updates data structure management module 242, and the core data structure 290 is provisioned and managed by the core data structure management module 244. In some embodiments, the updates data structure 280 comprises a log-structured merge (LSM) tree data structure 282, and the core data structure 290 comprise a B+ tree data structure 292, the structures and functions of which will be discussed in further detail below.

The storage data server 220 implements functions as discussed above such as processing I/O write and read requests received from host systems to write/read data to/from the storage devices 250. The storage virtualization management module 222 implements any suitable logical volume management (LVM) system which is configured to create and manage the storage volumes 252 by aggregating the capacity of the storage devices 250 into one or more virtual storage pools that are thin-provisioned for maximum capacity, and logically dividing each storage pool into one or more storage volumes that are exposed as block devices (e.g., LUNs) to the applications or host systems 110 (FIG. 1) which consume the data. The data management services module 225 implements one or more types of data management services including, but not limited to, inline data compression/decompression, thin provisioning, and data protection functions such as data replication, data backup, data snapshot, and data protection and resiliency schemes based on data striping and/or parity (e.g., erasure coding, RAID, etc.), and other types of data management functions, depending on the system configuration. In embodiments where the storage data server 220 abstracts the physical media (e.g., storage devices 250) and presents logical (virtualized) addresses to users in the form of LUNs, the storage data server 220 generates metadata to provide mapping between logical addresses and physical addresses. In addition, the storage control system 210 generates metadata which is utilized for managing snapshots, change tracking for remote replication, managing deduplication pointers, managing data compression, resiliency related metadata (e.g., RAID), etc. The metadata management system 240 manages the metadata generated by the storage control system 210.

The write cache management system 230 implements methods that are configured to provision and manage the write cache 262 in the primary memory 260 or in primary storage as provided by the array of storage devices 250. In some embodiments, the write cache 262 is utilized to serve I/O write requests by persistently storing data items (e.g., write data) together with associated metadata items in the write cache 262. In this regard, the write cache 262 reduces the overhead for handling write data and associated metadata since the write data and associated metadata is initially persisted in the write cache 262 without the need for extra I/O to store the metadata items separately from the data items. In addition, when the storage control system 210 receives an I/O write request and associated write data from a given host system, the storage control system 210 will send an acknowledgment to the host system to indicate that the write data is successfully written to the primary storage, in response to the received write data and associated metadata being stored in the write cache 262.

In some embodiments, the write cache 262 is implemented as a cyclic buffer, wherein items (e.g., data items and metadata items) are always written to a head location of the write cache 262, and items are destaged from a tail location of the write cache 262. With this scheme, the items in the write cache 262 are arranged in a cyclic write order from a tail location of the write cache 262 to the head location of the write cache 262. Further, in some embodiments, the write cache management system 230 utilizes a plurality of pointers in conjunction with the write cache 262 (e.g., cyclic write cache) to (i) determine a tail location and head location of the write cache 262, (ii) determine a location in the write cache 262 from where a recovery process, and to (iii) keep track of the data items and metadata items that destaged from the tail of the write cache 262 via destage operations performed by the write cache destage control module 232.

More specifically, the write cache destage control module 232 implements write cache eviction/destaging operations which take into consideration that the write cache 262 comprises both data items and associated metadata items, which are separate entities that are persisted in different primary data structures. In some embodiments, the write cache destaging operations are configured to destage data items and destage metadata items, separately, based on associated eviction/destaging policies. For example, the metadata items destaged from the write cache 262 are persisted in the primary metadata structure 270 using techniques as discussed in further detail below.

The metadata management system 240 utilizes the write cache 262 in conjunction with the primary metadata structure 270 to persist, manage, and access metadata maintained on the storage node 200. Collectively, the write cache 262 and the primary metadata structure 270 provide a high-performance data structure that enables efficient management of metadata in the storage system. Various techniques for high-performance metadata management will now be discussed in further detail in conjunction with FIGS. 3, 4, 5, 6, and 7.

Figure 3:
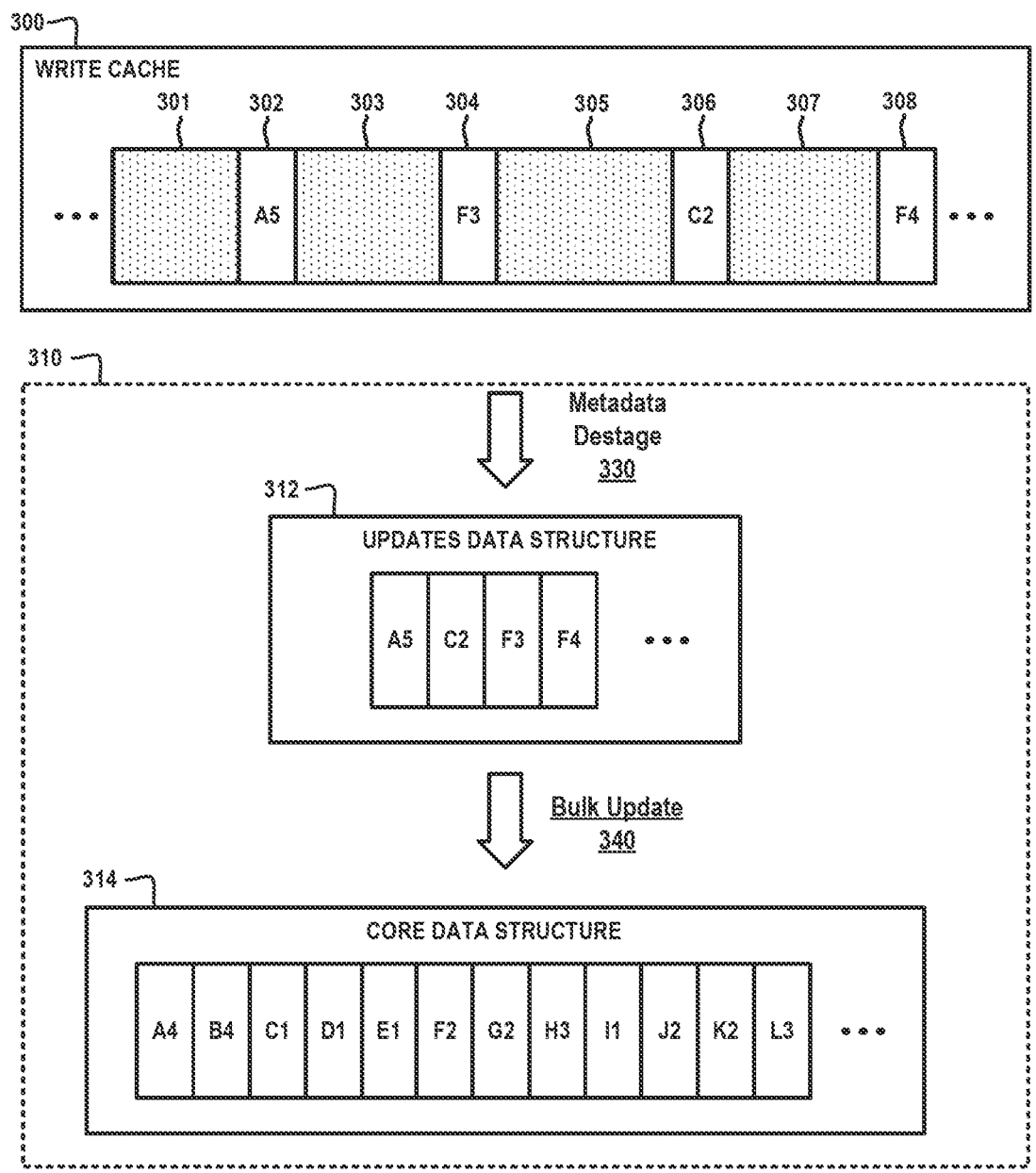
FIG. 3 schematically illustrates process for utilizing a high-performance data structure for managing metadata in a storage system, according to an exemplary embodiment of the disclosure.

For example, FIG. 3 schematically illustrates process for utilizing a high-performance data structure for managing metadata in a storage system, according to an exemplary embodiment of the disclosure. More specifically, FIG. 3 schematically illustrates a write cache 300, and a primary metadata structure 310. The primary metadata structure 310 comprises an updates data structure 312, and a core data structure 314. As noted above, the write cache 300 is configured to initially persist data items (e.g., write data of I/O write requests) and metadata items to thereby serve I/O write requests with a minimal delay, and allow the storage control system 210 to return an acknowledgment to a host system when the write data of an I/O write request and associated metadata is successfully written to the write cache 300.

As shown in FIG. 3, the write cache 300 comprises a plurality of data items 301, 303, 305, and 307, and a plurality of associated metadata items 302, 304, 306, and 308. In the illustrative embodiment of FIG. 3, each metadata item 302, 304, 306, and 308 is labeled by a letter and a number. For instance, the metadata item 302 is labeled A5, the metadata item 304 is labeled F3, the metadata item 306 is labeled C2, and the metadata item 308 is labeled F4. The letter of a given metadata item represents a location of the data item (e.g., an offset in a file or volume, or an object ID) associated with the given metadata item, and the number represents a consecutive order of update of the data item (e.g., A5 denotes a next change to A4 for location "A"). In other words, the number represents a generation (or revision) number of the given data item. In an exemplary embodiment in which the allocation units (i.e., fixed-size addressable units) of the storage devices have a fixed "allocation unit size" of, e.g., 8 KB, and the letters represent offset locations in a given volume, then the following representations may apply: A→offset 0, B→offset 8 KB, C→offset 16 KB, D→offset 24 KB, E→offset 32 KB, etc.

Since writes to the write cache 300 are acknowledged to the host, the write cache 300 is configured to serve read requests for the cached data items that have not yet been destaged to the primary storage. To serve reads, the data in the write cache 300 must have lookup capabilities. However, the write cache 300 is optimized for writes and not for reads and, thus, the metadata in the write cache 300 is not random access. The lookup capability is provided by the updates data structure 312 and the core data structure 314. In other words, the primary metadata structure 310 provides a joint metadata structure to access data items in the write cache 300 before the data items are destaged and stored to primary storage (e.g., HDD/SSD primary storage devices of the storage system), as well as to access data items after they are destaged from the write cache 300 and stored to primary storage.

As noted above, in some embodiments, the write cache 300 is located on the same storage device as the data, while in other embodiments, the write cache 300 is allocated in a region of a persistent memory. In such instance, metadata is required to access both the primary storage and the write cache 300. The updates and core data structures as discussed herein are utilized to refer to storage and cache interchangeably. A data item that was originally placed in the write cache may be destaged, involving an update to a metadata item, using all the same structures. This is enabled by the ability to persist micro updates with negligible I/O overhead.

The updates data structure 312 is configured to accumulate changes to metadata and provide write amortization to the core data structure 314. As shown in FIG. 3, the metadata items in the write cache 300 are added to the updates data structure 312 by performing a metadata destage operation 330 under control of the write cache destage control module 232. The metadata destage operation 330 involves writing copies of the metadata items in the write cache 300 to an in-memory buffer in RAM, which is allocated to the updates data structure management module 242 for temporarily buffering cached metadata items before persisting the metadata items in the updates data structure 312. When the in-memory buffer becomes full (e.g., the number or amount of metadata items in the buffer reaches a predetermined buffer size), the metadata items are persisted to the updates data structure 312. During the metadata destage operation 330, resiliency of the metadata items is provided by the write cache 300 until the buffered metadata items are persisted in the updates data structure 312. Once the metadata items are persisted in the updates data structure 312, the cached metadata items are no longer needed, and can be removed from the write cache 300.

As shown in FIG. 3, the data and associated metadata items in the write cache 300 are arranged in a temporal order based on, e.g., an order in which user writes are received by the storage control system. In other words, assuming that the letters (e.g., A, F, C, F, etc.) of the data items and associated metadata items represent offset location in a given volume, the items in the write cache 300 are not arranged in "alphabetic order" but instead are arranged in temporal order. However, when the metadata items are destaged from the write cache 300 and persisted in the updates data structure 312, the metadata items are arranged in the updates data structure 312 in a sorted manner (e.g., alphabetical order) to facilitate indexing and searching of the metadata items.

To enable lookup using the updates data structure 312, the internal ordering of the updates data structure 312 is the same as the internal ordering of the core data structure 314 in that both data structures 312 and 314 utilize the same key (e.g., the keys (letters) which represent the offset positions in a given volume). In some embodiments, to support swapping of metadata, the updates data structure 312 comprises pages, each of which may or may not be in the system RAM. Each page comprises a unit of capacity that is allocated to store metadata items. For example, in some embodiments, the page size for the updates data structure 312 can be 512 bytes, 1,024 bytes (1 KB), 2,048 bytes (2 KB), 4,096 bytes (4 KB), 8,192 bytes (8 KB), etc.

The core data structure 314 is a primary metadata storage and indexing structure, which is configured to contain all the metadata except the most recent metadata that is contained in the updates data structure 312. The core data structure 314 is essentially a semi-static data structure since all metadata updates are first accumulated in the updates data structure 312, and then eventually persisted to the core data structure 314 using a bulk update operation 340, as schematically shown in FIG. 3. The updates data structure 312 essentially serves as a journal which persists and accumulates most recent changes of the metadata items, and then over time, the metadata is sorted into the core data structure 314. The bulk update operation 340 is occasionally performed to apply metadata updates from the updates data structure 312 to the core data structure 314. The occasional bulk update operation 340 leads to large-scale changes to the core data structure 314, which allows for many optimizations including, but not limited to, write amortization, tree balancing, removal of deleted items, constructing new inner nodes of the core data structure 314 when write-in-place is avoided.

In some embodiments, the updates data structure 312 is implemented using an LSM tree data structure, and the core data structure 314 is implemented using a B+ tree data structure. The combined use of the LSM tree and B+ tree data structure provides a high-performance data structure for managing metadata. More specifically, the B+ tree data structure is utilized to implement a primary lookup and address mapping functionality, while the LSM tree data structure is configured to provide write amortization for metadata updates (e.g., adding new metadata items, modifying metadata items, deleting/invalidating metadata items. The LSM tree data structure allows for low-latency writing of metadata to a persistent data structure using out-of-place updates in which metadata items (new metadata items, updated metadata items) are always stored to new locations instead of overwriting old entries (eliminating the need for random I/Os for writes). The LSM tree data structure enhances write performance for persisting the metadata since the LSM tree data structure can exploit sequential I/Os to handle a high rate of write operations and, thereby, allow metadata to be quickly persisted to support high-throughput writes. In addition, the LSM tree data structure comprises a multilevel tree-like structure which is configured to progressively store key-value pairs associated with metadata items to enable read access to the metadata items using binary searches, indexing structures, bloom filters, etc.

The B+ tree data structure implements a primary metadata storage and indexing structure, which is configured to contain all the metadata except the most recent metadata updates that are accumulated in the LSM data structure. The B+ tree data structure is optimized for read access to metadata items as the B+ tree data structure allows random or sequential I/O access to the metadata items. However, a B+ tree data structure is not optimized for write operations, as the B+ tree data structure is typically configured for in-place updates in which old records are overwritten to store new updates. In this regard, the use of a B+ tree data structure alone to manage metadata would sacrifice write performance, as updates to the B+ tree data structure incur random I/Os as every write to the B+ tree data structure has to perform multiple write operations including a write of the given record, as well as performing required metadata updates to the B+ tree data structure with regard to moving, splitting and merging nodes in the B+ tree data structure, whereby resulting in slower writes. In this regard, the LSM tree data structure is utilized to accumulate metadata changes with high write performance, and heavily buffer such metadata changes for subsequent addition to the B+ tree data structure using bulk update operations outside the I/O processing path. Exemplary embodiments of LSM and B+ tree data structures will be discussed in further detail below in conjunction with FIGS. 5 and 6.

Figure 4:
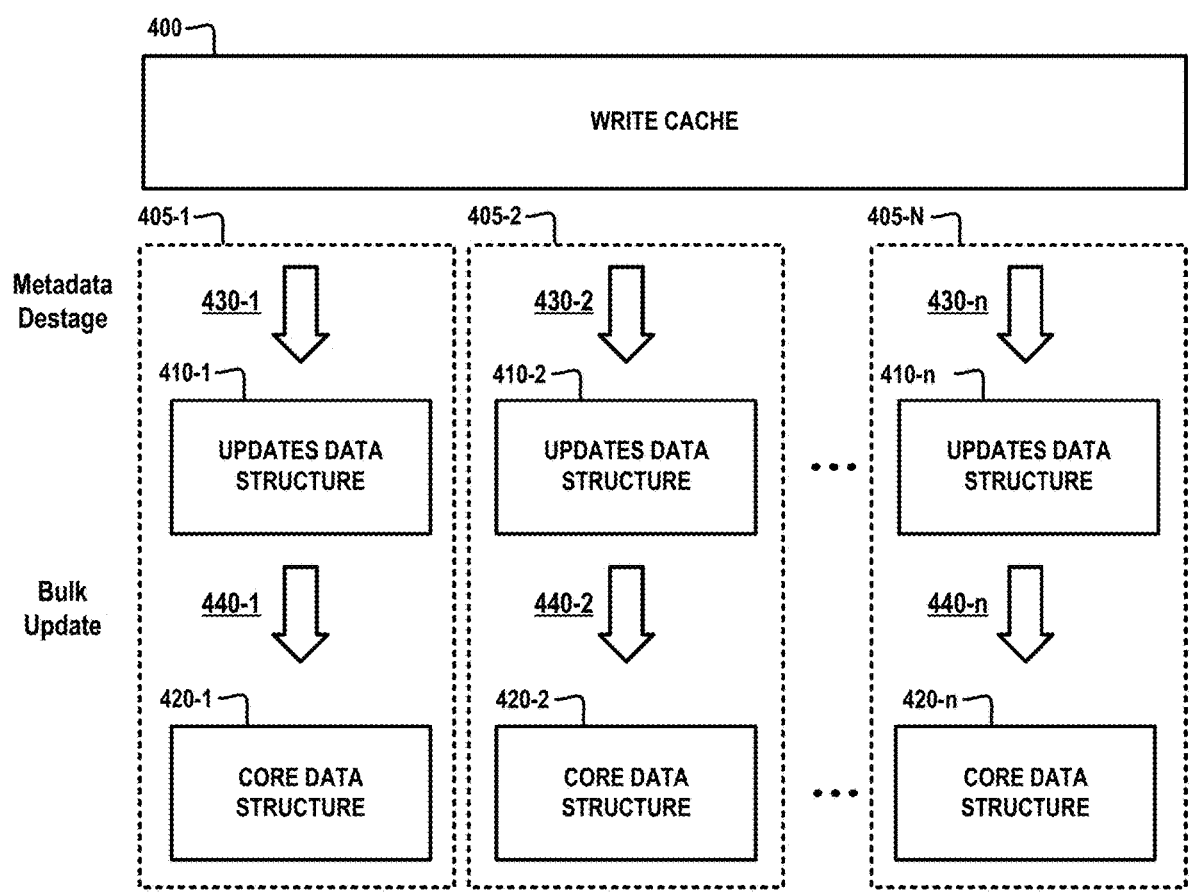
FIG. 4 schematically illustrates process for utilizing multiple high-performance data structures for managing metadata in a storage system, according to an exemplary embodiment of the disclosure.

FIG. 4 schematically illustrates process for utilizing multiple high-performance data structures for managing metadata in a storage system, according to an exemplary embodiment of the disclosure. More specifically, FIG. 4 schematically illustrates a write cache 400 which is configured to support two or more primary metadata structures 405-1, 405-2, . . . 405-N, which are utilized for different applications. Each primary metadata structure 405-1, 405-2, . . . 405-N comprises a respective updates data structure 410-1, 410-2, . . . 410-$n$ and a respective core data structure 420-1, 420-2, . . . 420-$n$. The metadata insertions to the updates data structures 410-1, 410-2, . . . 410-$n$ are lightly buffered by the write cache 400 via respective metadata destage operations 430-1, 430-2, . . . 430-$n$. The update data structures 410-1, 410-2, . . . 410-$n$ apply accumulated metadata changes to the respective core data structure 420-1, 420-2, . . . 420-$n$ via respective bulk update operations 440-1, 440-2, . . . 440-$n$.

The primary metadata structures 405-1, 405-2, ... 405-N are utilized for different applications. For example, the primary metadata structure 405-1 can be configured to support address mapping using techniques as discussed herein. Moreover, the primary metadata structure 405-2 can be implemented for monitoring the utilization and free capacity of data blocks in a storage system using the exemplary techniques disclosed in U.S. application Ser. No. 17/361,666, filed on Jun. 29, 2021, entitled "Tracking Utilization of Data Blocks in a Storage System," which is commonly assigned and incorporated herein by reference.

Furthermore, in some embodiments, the primary metadata structure 405-N can be implemented to manage metadata associated with a fingerprints lookup database for deduplication. Such a database is used to compare a fingerprint (e.g., hash) of new data being written to the storage system with the fingerprints of existing data in the storage system which are included in the lookup database. New data that is not deduplicated will have its fingerprints added to the database. Typically, the size of the deduplication database is too large to fit in RAM. However, using a primary metadata structure as disclosed herein, the lookup in the database can be performed lazily for pages not currently in RAM. The new fingerprints are added to the updates data structure, and as they propagate down the LSM tree data structure, the detection of identical fingerprints is an indication of potential deduplication that can now take place.

Figure 5:
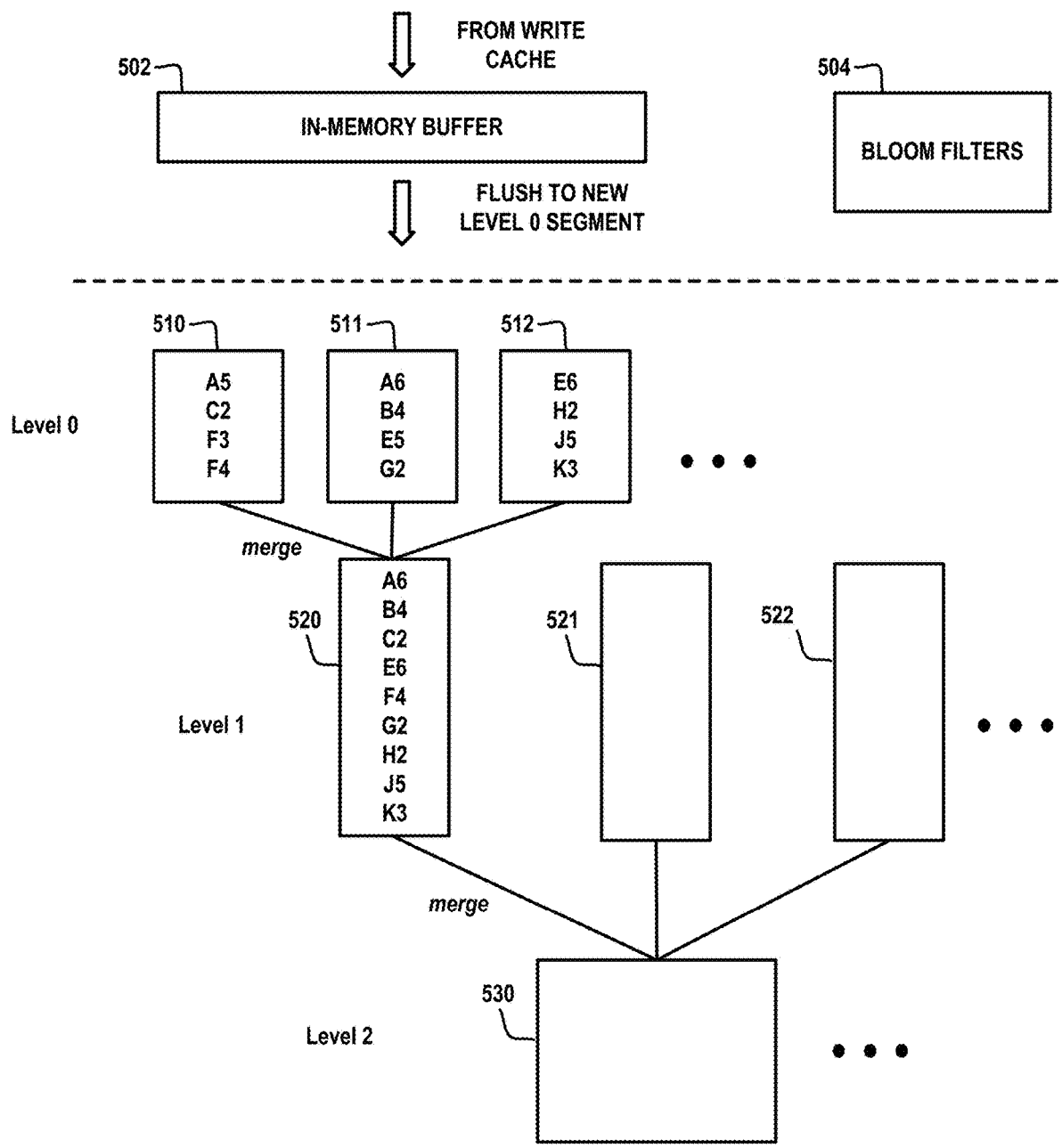
FIG. 5 schematically illustrates an exemplary log-structured merge (LSM) tree data structure which is utilized to implement a high-performance data structure for managing metadata in a storage system, according to an exemplary embodiment of the disclosure.

FIG. 5 schematically illustrates an exemplary LSM tree data structure 500 which is utilized to implement a high-performance data structure for managing metadata in a storage system, according to an exemplary embodiment of the disclosure. The exemplary LSM tree data structure 500 implements an in-memory buffer 502, and comprises bloom filters 504, and a multilevel structure comprising one or more segment levels, e.g., Level 0, Level 1, and Level 2. The LSM tree data structure 500 is configured to enable write amortization for accumulating changes to metadata items (e.g., adding new metadata items, updating metadata items, and deleting metadata items) which are first written to the persistent write cache.

The in-memory buffer 502 comprises an in-memory structure that buffers metadata items that are destaged from the write cache. As noted above, metadata items in the write cache are destaged by copying the metadata items to the in-memory buffer 502. In some embodiments, the metadata items are inserted into the in-memory buffer 502 and sorted in order (e.g., by offset location, and generation number). When the in-memory buffer 502 reaches a predefined threshold size (e.g., allocation unit size, page size, etc.), the accumulated metadata items within the in-memory buffer 502 are flushed to a Level 0 segment of the LSM tree data structure 500.

For example, as shown in FIG. 5, the LSM tree data structure 500 comprises a plurality of Level 0 segments 510, 511, and 512, etc. (or root segments). Each Level 0 segment 510, 511, and 512 comprises a persistent immutable data structure which stores a plurality of metadata items that are flushed from the in-memory buffer 502 at a given time. The process of updating the LSM tree data structure 500 prevents a high rate of updates to the Level 0 layer of the LSM tree data structure 500 by accumulating metadata changes (e.g., hundreds) in the write cache before the metadata items are written persistently from the in-memory buffer 502 to new Level 0 segment at once. Once the metadata items are persisted in a Level 0 segment, the metadata items in the write cache can be deleted.

More specifically, in the exemplary embodiment of FIG. 5, the segment 510 comprises sorted metadata items (A5, C2, F3, F4), the segment 511 comprises sorted metadata items (A6, B4, E5, G2), and the segment 512 comprises sorted metadata items (E6, H2, J5, K3). While FIG. 5 shows each Level 0 segment 510, 511, and 512 having four (4) metadata items for ease of illustration, each Level 0 segment 510, 511, and 512 can have hundreds of metadata items (e.g., the Level 0 segments 510, 511, and 512 can each have a size of 8 KB (similar to the allocation unit size, or page size, etc.). The segment 510 comprises metadata items F3 and F4 where F4 denotes a recent change to data at offset location F from the previous version F3. In addition, segments 510 and 511 include respective metadata items A5 and A6, where A6 denotes a recent change to data at offset location A from the previous version A5. Further, segments 511 and 512 include respective metadata items E5 and E6, where E6 denotes a recent change to data at offset location from the previous version E5. In this regard, the updated metadata items are written out-of-place by appending an update to the same or a new Level 0 segment as cached metadata items in the write cache are added to the LSM tree data structure 500. The older values for metadata items are removed at a later point in time through merge operations (or compaction operations). In the event of a crash while metadata items are still in the in-memory buffer 502, the write cache will be used to recover on the next restart.

The Level 0 segments are continuously generated as more blocks of cached metadata items are flushed from the in-memory buffer 502. Periodically, multiple segments in a given Level of the LSM tree data structure 500 are merged together to reduce the number of segments that need to be searched. For example, as shown in FIG. 5, the segments 510, 511, and 512 in Level 0 are merged to form the segment 520 in Level 1 of the LSM tree data structure 500. The segment 520 aggregates the metadata items from each of the Level 0 segments 510, 511, and 512, and stores the metadata items in a sorted order. Following the merge operation, the Level 0 segments 510, 511, and 512 are removed from the LSM tree data structure 500. While not specifically shown in FIG. 5, the segments 521 and 522 in Level 1 of the LSM tree data structure 500 could each have a plurality of sorted entries aggregated from merging different blocks of three segments in Level 0 of the LSM tree data structure 500. Moreover, a segment 530 in Level 2 of the LSM tree data structure 500 could have a plurality of sorted records as a result of merging the segments 520, 521, and 522 in Level 2 of the LSM tree data structure 500. The LSM tree data structure 500 uses very few writes to propagate entries from one level to the next by merging segments.

In some embodiments, each segment in the LSM tree data structure 500 is stored as a file, wherein the metadata items in a given segment divided in fixed size pages (e.g., 8 KB blocks) of the file. More specifically, in some embodiments, each segment in each level of the LSM tree data structure 500 is divided into one or more pages which facilitates access, memory allocation, persistency, and swapping segments or portions of segments in and out of memory. For example, assume that each Level 0 segment has a size equivalent to a page size (e.g., 8 KB), the segments of higher levels (e.g., Level 1, Level 2, etc.) will be increasing larger in size and have multiple pages.

The pages are used for purposes of memory allocation and to facilitate lookup for a target metadata item in the LSM tree data structure 500. For example, each segment can have additional metadata with regard to the page(s) of the segment, wherein such metadata comprises a page key for each page in the segment, and an associated value which represents the key (e.g., offset location) of the first metadata item within the given segment. To locate a given entry in a given segment, the segment may include a page index which records a key of the first entry in each page. The page index together with the Bloom filters 504 provides for fast searching of metadata items in the LSM tree data structure 500.

In particular, when searching for a given metadata item which may be located in a given segment of the LSM tree data structure 500, the Bloom filters 504 will be used initially to enable efficient per-segment lookup. A Bloom filter for a given segment provides an indication that (i) the given segment may contain a key that is being searched for with a high probability, or that (ii) the given segment does not include the key that is being searched. In some embodiments, if a given segment is identified (via Bloom filtering) to likely have the target key, a binary search can be conducted to find and access the key within the given segment (if the key does in fact exist in the given segment). In some embodiments, for large sized segments, once a given segment is identified (via Bloom filtering) to most likely contain the target key, the page index for the given segment can be used to identify the page within the given segment which would have the key (if the key was indeed in the segment). Once the target page in the given segment is identified via the page index, the page can be loaded to memory and to perform a binary search of the keys in the target page to find the target key. In this regard, the first key of each page is maintained in RAM to reduce the search within a segment to a single page utilizing the fact that the segments are sorted.

Figure 6:
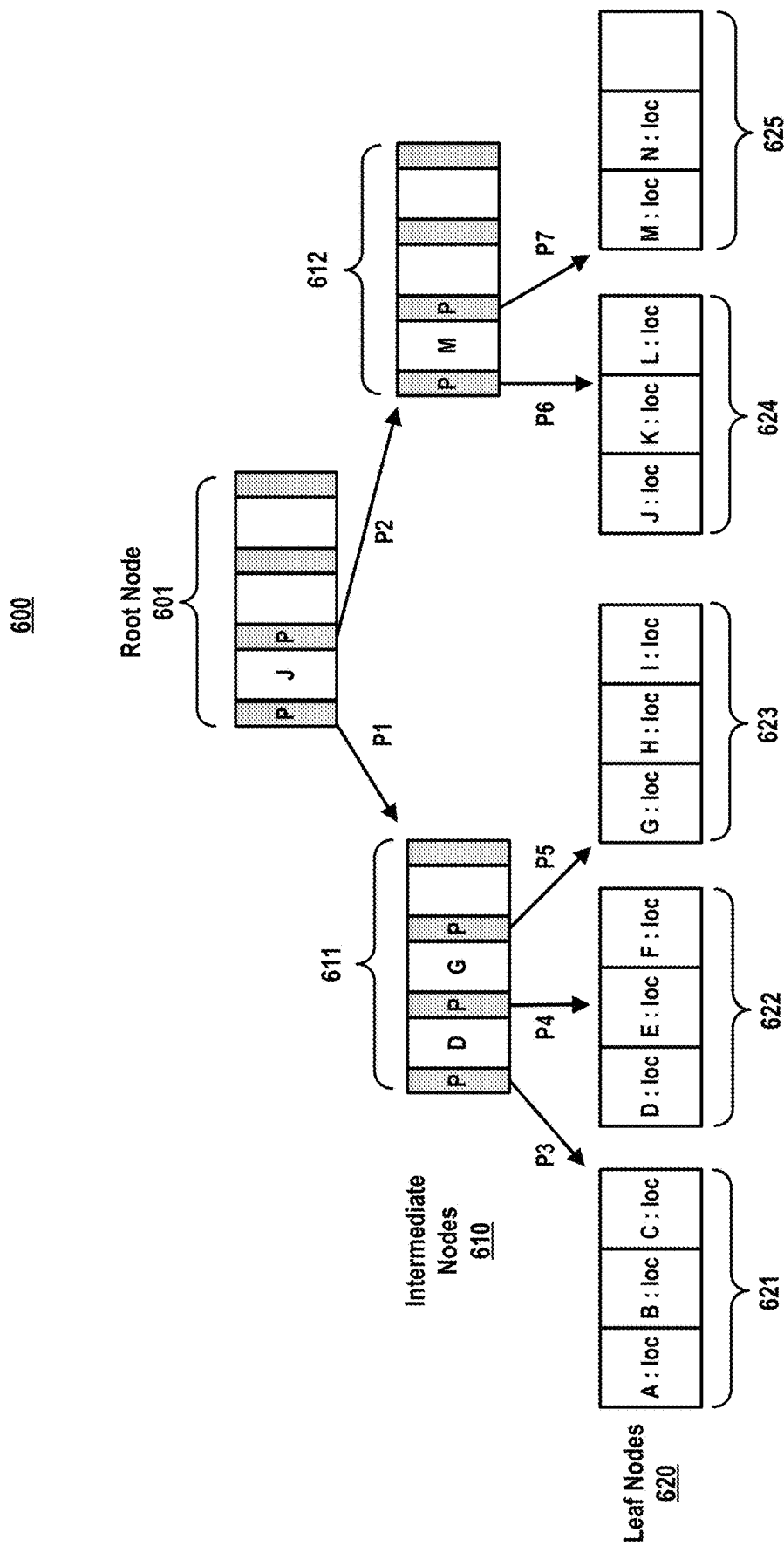
FIG. 6 schematically illustrates an exemplary B+ tree data structure which is utilized to implement a high-performance data structure for managing metadata in a storage system, according to an exemplary embodiment of the disclosure.

FIG. 6 schematically illustrates an exemplary B+ tree data structure which is utilized to implement a high-performance data structure for managing metadata in a storage system, according to an exemplary embodiment of the disclosure. In particular, FIG. 6 schematically illustrates an exemplary B+ tree data structure 600 comprising three levels of nodes including a root level comprising a root node 601, an intermediate node level 610, and a leaf node level 620. The intermediate node level 610 comprises two intermediate nodes 611 and 612, and the leaf node level 620 comprises five leaf nodes 621, 622, 623, 624, and 625, wherein all leaf nodes are in the same level of the B+ tree data structure 600. For ease of illustration, FIG. 6 depicts an exemplary B+ tree data structure 600 which is configured, at a given point in time, to enable random access to stored data items in fourteen (14) offset locations identified by metadata keys A, B, C, D, E, F, G, H, I, J, K, L, M and N.

Furthermore, for ease of illustration, the exemplary B+ tree data structure 600 is an n-order tree structure, wherein n=3. The "order" of a B+ tree data structure denotes a maximum number of key fields that a given node can have. For n=3, the internal nodes and leaf nodes can have at most n=3 key fields and n+1=4 pointer fields. In addition, when n=3, each leaf node must have a least two (2) entries, and each non-leaf node must have at least one (1) entry and two (2) pointers. In practice, the order n of the B+ tree data structure 600 would be in the hundreds, or thousands, etc. In this regard, while the exemplary embodiment of FIG. 6 shows the exemplary B+ tree data structure 600 having three levels of nodes (the root node 601 level, the intermediate node level 610, and the leaf node level 620 level), it is to be understood that at any given time, there can be zero (0) to N intermediate levels of nodes. For example, as is known in the art, a B+ tree data structure grows from the leaf nodes upwardly. In this regard, at some period of time, the B+ tree may only have leaf nodes, with zero (0) non-leaf nodes.

In the exemplary B+ tree data structure 600, each non-leaf node 601, 611, and 612 includes one or more keys (e.g., offset locations), and each leaf node 621, 622, 623, 624, and 625 includes one or more key:value pairs. Each key:value pair comprises a key (represented by a letter) whose value represents, e.g., a logical offset location of the data in volume, and a value "loc" which identifies (e.g., pointer) a physical location of the data in the physical storage space. The B+ tree data structure 600 is configured to organize the metadata items in a manner which enables efficient mapping and lookup functionality for metadata items and associated data blocks as identified in the leaf nodes 621, 622, 623, 624, and 625. In the exemplary embodiment of FIG. 6, the root node 601 comprises a key value J, with a pointer P1 to the intermediate node 611, and a pointer P2 to the intermediate node 612. The root node 601 comprises two empty key fields and two empty pointer fields, which can be used when new leaf nodes are added to the B+ tree data structure 600, resulting in a change in the structure of the inner nodes (root and intermediate nodes). The pointer P1 points to a branch of the B+ tree data structure 600 having nodes with key values that are less than the key value of J. The pointer P2 points to a branch of the B+ tree data structure 600 having nodes with key values that are greater than, or equal to, the key value J. More specifically, the pointer P1 points to the intermediate node 611, while the pointer P2 points to the intermediate node 612.

As further shown in FIG. 6, the intermediate node 611 comprises key values D and G, and pointers P3, P4, and P5. The intermediate node 611 includes one empty key field and one empty pointer field, which can be used when new leaf nodes are added to the B+ tree data structure 600. The pointer P3 points to the leaf node 621 having a plurality of key:value pairs (e.g., A:loc; B:loc; C:loc), with key values A, B and C which are less than the key value D. The pointer P4 points to the leaf node 622 having a plurality of key:value pairs (e.g., D:loc; E:loc; F:loc), with key values D, E, and F which are greater than or equal to the key value of D, but less than the key value of G. The pointer P5 points to the leaf node 623 having a plurality of key:value pairs (e.g., G:loc; H:loc; I:loc), with key values G, H, and I which are greater than or equal to the key value of G, but less than the key value J.

Furthermore, the intermediate node 612 comprises a key value M and pointers P6 and P7. The intermediate node 612 comprises two empty key fields and two empty pointer fields, which can be used when new leaf nodes are added to the B+ tree data structure 600. The pointer P6 points to the leaf node 624 having a plurality of key:value pairs (e.g., J:loc; K:loc; L:loc), with key values J, K, and L which are less than the key value M. The pointer P7 points to the leaf node 625 having a plurality of key:value pairs (e.g., M:loc; N:loc) with key values M and N which are greater than or equal to the key value M. The leaf node 625 comprises an empty data record, which can be used when new leaf nodes are added to the B+ tree data structure 600. The B+ tree data structure 600 comprises a dynamic multilevel indexing data structure which can grow and shrink as leaf nodes are added or removed from the B+ tree data structure. The B+ tree data structure grows from the bottom up by the addition of new leaf nodes when data is written to storage using B+ tree insertion methods well-known to those of ordinary skill in the art.

In some embodiments, to support swapping, the nodes of the B+ tree data structure 600 (core data structure) are divided into pages similar to the LSM tree data structure 500 (updates data structure) as discussed above. In particular, the inner nodes and the leaf nodes of the B+ tree data structure 600 can be constructed from swappable pages. Even at a granularity of 4 KB, a reasonable system should be able to contain all the inner nodes of the B+ tree data structure in RAM, requiring only a single read to retrieve required metadata.

The updates data structure (e.g., LSM tree data structure 500) is optimized for writes, and handles individual writes. The LSM tree data structure can have multiple values per key. Insertions into the LSM tree data structure are lightly buffered by the write cache. On the other hand, the core data structure (e.g., B+ tree data structure 600) is optimized for reads, and is configured to handle bulk writes of updated metadata. The B+ tree data structure may have a single value per key. Insertions into the B+ tree data structure are heavily buffered by the updates data structure.

In some embodiments, the size of the updates data structure (e.g., LSM tree data structure 500) is determined by a compromise between two competing factors: (i) read performance and (ii) write performance. In particular, read performance is the highest when there is no entry in the updates data structure. In this regard, to enhance the overall read performance of the primary metadata structure, it is preferable to keep the updates data structure as small as possible. On the other hand, the overall write performance is greatest with a large updates data structure, so that the number of pages to update in the core data structure is small in relation to the number of changes being applied to the core data structure from the updates data structure. In some embodiments, a balance between read and write performance is achieved by keeping the size of the updates data structure to be approximately 1% the size of the core data structure. However, the size difference will depend on several factors such as the page size and the metadata entry size.

Figure 7:
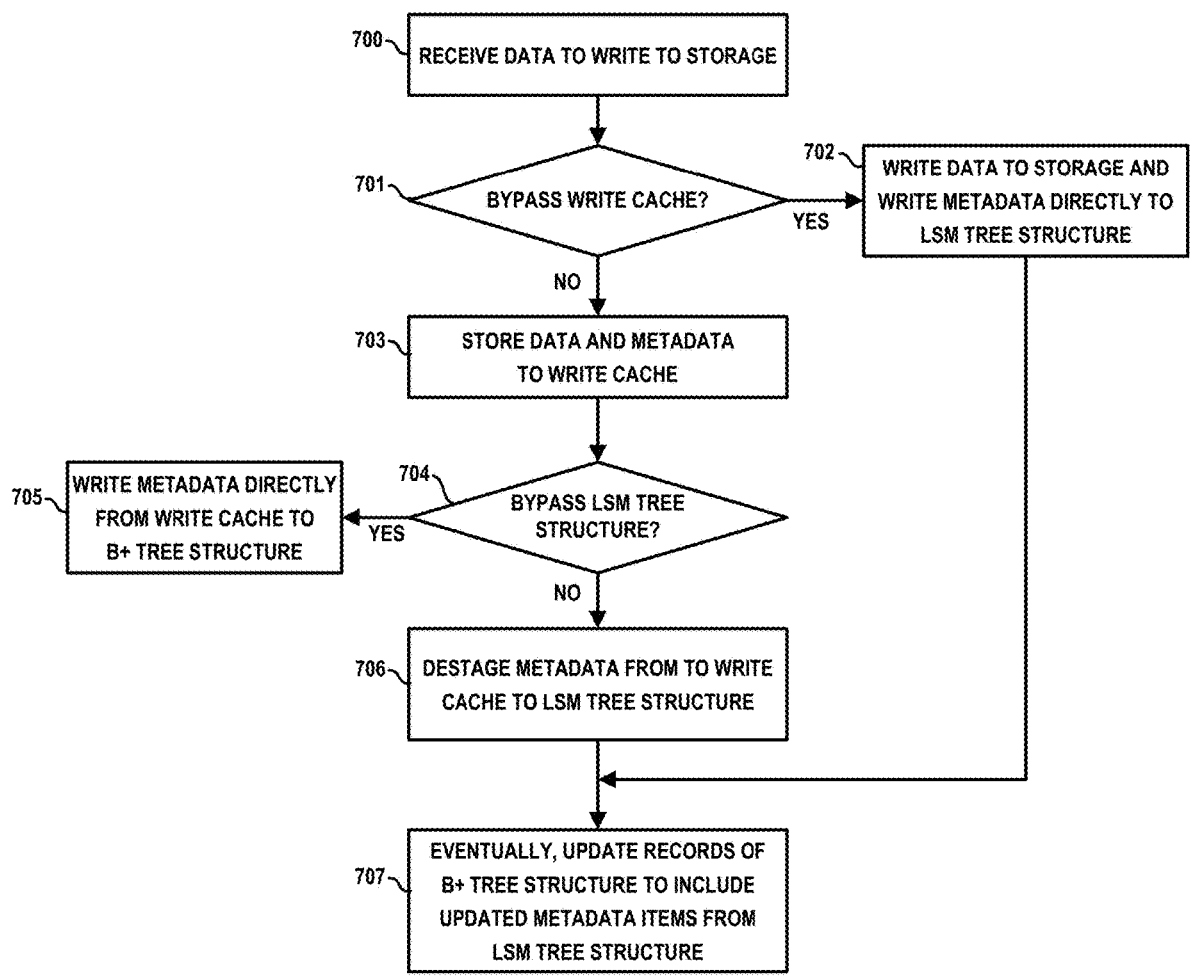
FIG. 7 illustrates a flow diagram of a method for managing metadata in a storage system, according to an exemplary embodiment of the disclosure.

FIG. 7 illustrates a flow diagram of a method for managing metadata in a storage system, according to an exemplary embodiment of the disclosure. In particular, FIG. 7 illustrates an exemplary process flow which provides optimizations for bypassing the write cache and/or the updates data structure, under various circumstances. Referring to FIG. 7, the storage control system receives data to write to primary storage (block 700). In some embodiments, the storage control system can determine whether or not to bypass the write cache under certain conditions (block 701). For example, very large writes can choke the bandwidth of the storage system if such large writes are first written to the write cache. This is because the data will be handled twice—a first time when writing to the write cache, and a second time when destaging from the write cache to storage. This data handling can result in network overload.

In such a case, if the storage controller determines that it is beneficial to bypass the write cache (affirmative determination in block 701), the data can be written directly to primary storage and the associated metadata can be written directly to the updates data structure, e.g., LSM tree data structure (block 702). In this instance, the large size of the write justifies a single write required to the top-most level (e.g., Level 0) of the LSM tree data structure. Eventually, the records of the core data structure (e.g., B+ tree data structure) will be updated to include the updated metadata items from the updates data structure (block 707). On the other hand, if the storage controller determines not to bypass the write cache (negative determination in block 701), the received data and associated metadata will be stored in the write cache (block 703).

In some embodiments, the storage control system can determine whether or not to bypass the updates data structure (e.g., LSM tree data structure) under certain conditions (block 704). More specifically, there are circumstances in which a write (or a set of writes) bypasses the updates data structure and is written directly to the core data structure. For example, there can be a circumstance which modifies a relatively large amount of consecutive metadata entries, in which case it is more efficient to write the updated metadata entries directly to the core data structure. One example may be a garbage collection operation that accumulates many changes and then writes such changes to the same location, leading to a localized bulk update. Another example is free capacity management, as is described in the above-incorporated patent application.

When the storage controller determines that it is beneficial to bypass the updates data structure (affirmative determination in block 704), the metadata updates are directly written from the write cache to the core data structure (block 705). When bypassing the updates data structure, caution must be exercised to avoid entering an illegal state by changing a value in the core data structure while there is an update still residing in the update data structure. In some cases, it may be legal to ignore these updates (as in the free capacity example above), and in other cases the change must be invalidated or removed from the updates data structure.

On the other hand, if the storage controller determines not to bypass the updates data structure (negative determination in block 704), the metadata items will be destaged from the write cache and written to the updates data structure (block 706) using an exemplary process as described above in conjunction with FIG. 3. Eventually, the records of the core data structure (e.g., B+ tree data structure) will be updated to include the updated metadata items from the updates data structure (block 707).

Figure 8:
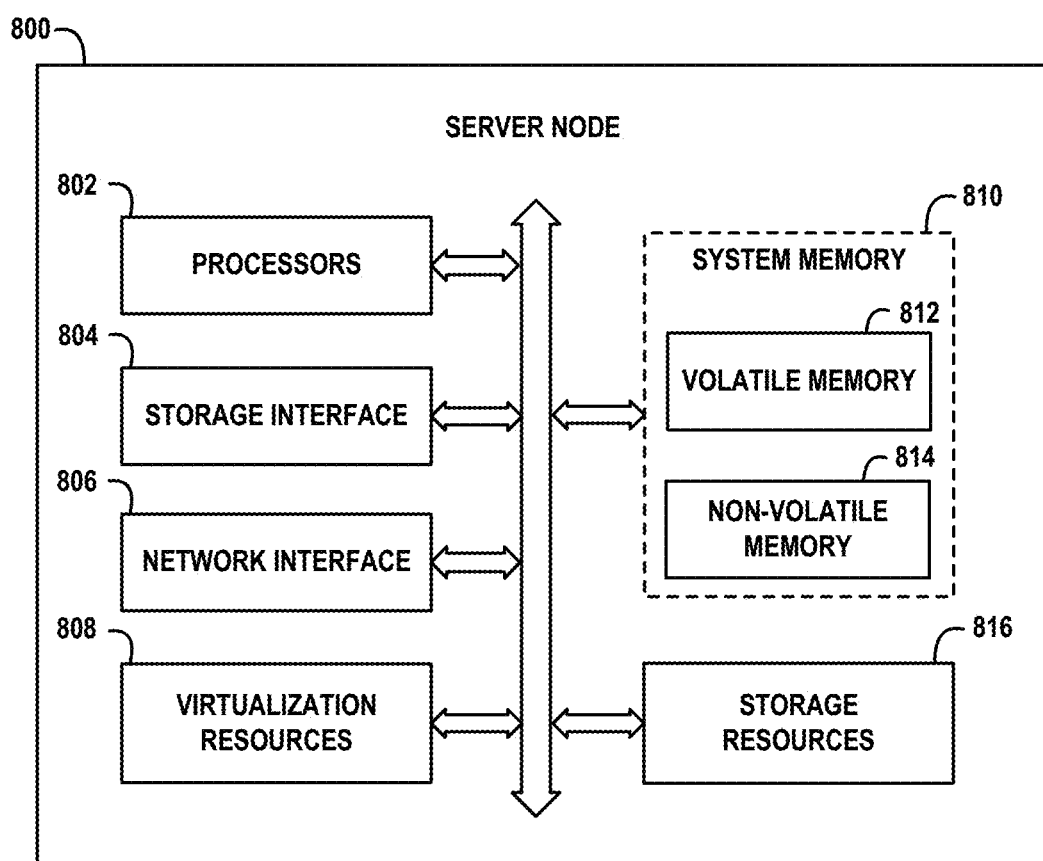
FIG. 8 schematically illustrates a framework of a server node for hosting a storage node which comprises a metadata management system, according to an exemplary embodiment of the disclosure.

FIG. 8 schematically illustrates a framework of a server node for hosting a storage node which comprises a data block utilization tracking system, according to an exemplary embodiment of the disclosure. The server node 800 comprises processors 802, storage interface circuitry 804, network interface circuitry 806, virtualization resources 808, system memory 810, and storage resources 816. The system memory 810 comprises volatile memory 812 and non-volatile memory 814. The processors 802 comprise one or more types of hardware processors that are configured to process program instructions and data to execute a native operating system (OS) and applications that run on the server node 800.

For example, the processors 802 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators.

Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 804 enables the processors 802 to interface and communicate with the system memory 810, the storage resources 816, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 806 enables the server node 800 to interface and communicate with a network and other system components. The network interface circuitry 806 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 808 can be instantiated to execute one or more services or functions which are hosted by the server node 800. For example, the virtualization resources 808 can be configured to implement the various modules and functionalities of a storage control system and a metadata management system as discussed herein. In some embodiments, the virtualization resources 808 comprise virtual machines that are implemented using a hypervisor platform which executes on the server node 800, wherein one or more virtual machines can be instantiated to execute functions of the server node 800. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 800, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host system. The underlying physical infrastructure may comprise one or more commercially available distributed processing platforms which are suitable for the target application.

In another embodiment, the virtualization resources 808 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 800 as well as to execute one or more of the various modules and functionalities of a storage control system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the constituent components and modules of the storage nodes and storage control systems as discussed herein, as well as the metadata management methods as discussed herein, are implemented using program code that is loaded into the system memory 810 (e.g., volatile memory 812), and executed by the processors 802 to perform respective functions as described herein. In this regard, the system memory 810, the storage resources 816, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 810 comprises various types of memory such as volatile RAM, NVRAM, or other types of memory, in any combination. The volatile memory 812 may be a dynamic random-access memory (DRAM) (e.g., DRAM DIMM (Dual In-line Memory Module), or other forms of volatile RAM. The non-volatile memory 814 may comprise one or more of NAND Flash storage devices, SSD devices, or other types of next generation non-volatile memory (NGNVM) devices. The system memory 810 can be implemented using a hierarchical memory tier structure wherein the volatile memory 812 is configured as the highest-level memory tier, and the non-volatile system 814 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 802 to execute a native operating system and one or more applications or processes hosted by the server node 800, and to temporarily store data that is utilized and/or generated by the native OS and application programs and processes running on the server node 800. The storage resources 816 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
   receiving, by a storage control system, data to be written to primary storage;
   writing, by the storage control system, the received data together with metadata to a write cache; and
   destaging, by the storage control system, the metadata from the write cache to a primary metadata structure which is configured to persistently store and index the metadata;
   wherein the primary metadata structure comprises (i) a first data structure that is configured to accumulate the metadata destaged from the write cache and organize the accumulated metadata in blocks of metadata sorted by index keys, and (ii) a second data structure that is configured to receive the accumulated metadata from the first data structure, and organize the received metadata using an index structure that enables random-access to the metadata using the index keys.

2. The method of claim 1, wherein the first data structure comprises a log-structured merge tree data structure.

3. The method of claim 1, wherein the second data structure comprises a B+ tree data structure.

4. The method of claim 1, wherein the primary metadata structure is configured to enable access to data in the write cache and data in the primary storage.

5. The method of claim 1, wherein destaging the metadata from the write cache to the primary metadata structure, comprises:
   copying, by the storage control system, a plurality of metadata items from the write cache into an in-memory buffer associated with the primary metadata structure;
   in response to the in-memory buffer reaching a predefined threshold size, flushing the plurality of metadata items from the in-memory buffer to the first data structure, wherein the plurality of metadata items are written out-of-place to an immutable root segment of the first data structure; and
   removing the plurality of metadata items from the write cache.

6. The method of claim 1, further comprising:
   determining, by the storage control system, whether to bypass the write cache when performing a write operation for a given block of data; and
   in response to determining to bypass the write cache:
      writing, by the storage control system, the given block of data directly to primary storage; and
      writing, by the storage control system, metadata associated with the given block of data directly to the first data structure of the primary metadata structure.

7. The method of claim 1, further comprising:
   determining, by the storage control system, whether to bypass the first data structure of the primary metadata structure when destaging the metadata from the write cache; and
   in response to determining to bypass the first data structure, writing, by the storage control system, the metadata directly to the second data structure of the primary metadata structure.

8. The method of claim 1, wherein:
   the write cache is implemented in one of (i) a non-volatile memory device of primary memory of a storage node and (ii) the primary storage in which data is stored; and
   the method further comprises sending, by the storage control system, an acknowledgment to at least one host system that the received data is successfully written to the primary storage, in response to the received data and associated metadata being stored in the write cache.

9. An article of manufacture comprising a non-transitory processor-readable storage medium having stored therein program code of one or more software programs, wherein the program code is executable by one or more processors to implement a method which comprises:
   receiving, by a storage control system, data to be written to primary storage;
   writing, by the storage control system, the received data together with metadata to a write cache; and
   destaging, by the storage control system, the metadata from the write cache to a primary metadata structure which is configured to persistently store and index the metadata;
   wherein the primary metadata structure comprises (i) a first data structure that is configured to accumulate the metadata destaged from the write cache and organize the accumulated metadata in blocks of metadata sorted by index keys, and (ii) a second data structure that is configured to receive the accumulated metadata from the first data structure, and organize the received metadata using an index structure that enables random-access to the metadata using the index keys.

10. The article of manufacture of claim 9, wherein the first data structure comprises a log-structured merge tree data structure.

11. The article of manufacture of claim 9, wherein the second data structure comprises a B+ tree data structure.

12. The article of manufacture of claim 9, wherein the primary metadata structure is configured to enable access to data in the write cache and data in the primary storage.

13. The article of manufacture of claim 9, wherein the program code for destaging the metadata from the write cache to the primary metadata structure, comprises program code for:
   copying, by the storage control system, a plurality of metadata items from the write cache into an in-memory buffer associated with the primary metadata structure;
   in response to the in-memory buffer reaching a predefined threshold size, flushing the plurality of metadata items from the in-memory buffer to the first data structure, wherein the plurality of metadata items are written out-of-place to an immutable root segment of the first data structure; and
   removing the plurality of metadata items from the write cache.

14. The article of manufacture of claim 9, further comprising program code for:
   determining, by the storage control system, whether to bypass the write cache when performing a write operation for a given block of data; and
   in response to determining to bypass the write cache:
      writing, by the storage control system, the given block of data directly to primary storage; and
      writing, by the storage control system, metadata associated with the given block of data directly to the first data structure of the primary metadata structure.

15. The article of manufacture of claim 9, further comprising program code for:
  determining, by the storage control system, whether to bypass the first data structure of the primary metadata structure when destaging the metadata from the write cache; and
  in response to determining to bypass the first data structure, writing, by the storage control system, the metadata directly to the second data structure of the primary metadata structure.

16. The article of manufacture of claim 9, wherein the write cache is implemented in one of (i) a non-volatile memory device of primary memory of a storage node and (ii) the primary storage in which data is stored; and
  further comprising program code for sending, by the storage control system, an acknowledgment to at least one host system that the received data is successfully written to the primary storage, in response to the received data and associated metadata being stored in the write cache.

17. An apparatus comprising:
  at least one processor; and
  memory configured to store program code, wherein the program code is executable by the at least one processor to instantiate a storage control system, wherein the storage control system is configured to:
    receive data to be written to primary storage;
    write the received data together with metadata to a write cache; and
    destage the metadata from the write cache to a primary metadata structure which is configured to persistently store and index the metadata;
  wherein the primary metadata structure comprises (i) a first data structure that is configured to accumulate the metadata destaged from the write cache and organize the accumulated metadata in blocks of metadata sorted by index keys, and (ii) a second data structure that is configured to receive the accumulated metadata from the first data structure, and organize the received metadata using an index structure that enables random-access to the metadata using the index keys.

18. The apparatus of claim 17, wherein the first data structure comprises a log-structured merge tree data structure.

19. The apparatus of claim 17, wherein the second data structure comprises a B+ tree data structure.

20. The apparatus of claim 17, wherein the primary metadata structure is configured to enable access to data in the write cache and data in the primary storage.

* * * * *